United States Patent
Hu et al.

(10) Patent No.: US 10,018,044 B2
(45) Date of Patent: Jul. 10, 2018

(54) POWER INTEGRATED SYSTEM AND METHOD FOR DRILLING RIG AND OIL/GAS PRODUCTION EQUIPMENT

(71) Applicant: General Electric Company, Schenectady, NY (US)

(72) Inventors: Lishun Hu, Shanghai (CN); Junli Xue, Shanghai (CN); Ming Su, Shanghai (CN); Fengcheng Sun, Shanghai (CN); Jie Zhang, Shanghai (CN); Zhiguo Ren, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 605 days.

(21) Appl. No.: 14/614,705

(22) Filed: Feb. 5, 2015

(65) Prior Publication Data
US 2015/0233213 A1    Aug. 20, 2015

(30) Foreign Application Priority Data
Feb. 18, 2014 (CN) .......................... 2014 1 0054131

(51) Int. Cl.
*E21B 43/16* (2006.01)
*F01B 23/10* (2006.01)

(52) U.S. Cl.
CPC ............... *F01B 23/10* (2013.01); *E21B 43/16* (2013.01)

(58) Field of Classification Search
CPC ..................................................... E21B 43/16
See application file for complete search history.

(56) References Cited

U.S. PATENT DOCUMENTS

| 7,699,102 B2 | 4/2010 | Storm et al. |
| 8,446,037 B2 | 5/2013 | Williams |
| 2008/0017369 A1 | 1/2008 | Sarada |

(Continued)

FOREIGN PATENT DOCUMENTS

| CN | 201266838 Y | 1/2009 |
| CN | 102882232 A1 | 1/2013 |
| CN | 103573405 A | 2/2014 |

OTHER PUBLICATIONS

Unofficial English translation of Office Action & Search Report issued in connection with corresponding CN Application No. 201410054131.8 dated Nov. 1, 2016.

(Continued)

*Primary Examiner* — Giovanna C. Wright
(74) *Attorney, Agent, or Firm* — GE Global Patent Operation; Rita D. Vacca

(57) ABSTRACT

A power integrated system includes a gas storage unit, a gas driven generator, a power bus, a drilling rig, oil/gas production equipment, and a gas reformer. The gas storage unit is used for storing natural gas. The gas driven generator is used for generating electric power based on the stored natural gas. The power bus is used for receiving the electric power generated by the gas driven generator. The drilling rig is used for being driven by the electric power from the power bus. The oil/gas production equipment is used for being driven by the electric power from the power bus and for generating associated gas. The gas reformer is used for reforming the associated gas and supplying the reformed gas to the gas storage unit.

9 Claims, 6 Drawing Sheets

(56) References Cited

U.S. PATENT DOCUMENTS

| | | | |
|---|---|---|---|
| 2009/0076709 A1* | 3/2009 | Shiraishi | F02D 31/007 |
| | | | 701/103 |
| 2009/0195074 A1 | 8/2009 | Buiel | |
| 2009/0312885 A1 | 12/2009 | Buiel | |
| 2010/0018715 A1* | 1/2010 | Orbell | E21B 17/085 |
| | | | 166/337 |
| 2010/0314136 A1 | 12/2010 | Zubrin et al. | |
| 2012/0131898 A1* | 5/2012 | Mokheimer | F02C 1/05 |
| | | | 60/39.12 |
| 2012/0223524 A1 | 9/2012 | Williams | |
| 2012/0292992 A1 | 11/2012 | Williams | |
| 2013/0008716 A1* | 1/2013 | Kuittinen | B60L 11/1803 |
| | | | 175/24 |
| 2013/0214928 A1 | 8/2013 | Kuittinen et al. | |
| 2013/0234515 A1 | 9/2013 | Boone | |
| 2013/0271066 A1 | 10/2013 | Signorelli et al. | |
| 2013/0271083 A1 | 10/2013 | Williams | |
| 2013/0307444 A1 | 11/2013 | Settemsdal | |
| 2013/0313894 A1 | 11/2013 | Settemsdal | |
| 2013/0319765 A1 | 12/2013 | Piipponen et al. | |

OTHER PUBLICATIONS

Craig et al., "Integrated Power System Design for Offshore Energy Vessels and Deepwater Drilling Rigs", Industry Applications, vol. No. 48, Issue No. 4, pp. 1251-1257, Jul.-Aug. 2012.

Jin et al. "Research on flywheel energy storage system applied for the oil drilling platform", Power Engineering and Automation Conference, Wuhan, pp. 1-4, Sep. 18-20, 2012.

* cited by examiner

POWER INTEGRATED SYSTEM AND METHOD FOR DRILLING RIG AND OIL/GAS PRODUCTION EQUIPMENT

BACKGROUND

This disclosure generally relates to power integrated systems and methods for at least providing power to a drilling rig and oil/gas production equipment in or nearby a drilling field.

The exploration drilling and production of oil and natural gas from underground reservoirs have been widely done for decades. For drilling oil wells, some types of drilling rigs have been developed, such as land rig, jack-up rig, drill ship, and semi-submersible rig, etc. For producing oil and nature gas (namely associated gas) from drilled oil wells to earth surface, some types of oil/gas production equipment have been developed, such as artificial lift equipment for example. In addition, the oil/gas production equipment may further include a production separator used to separate out the associated gas, oil and water. After that, the oil and gas may be delivered to remote oil and gas factories for being refined according to different market needs. During the drilling and production process, some other auxiliary equipment may be applied as well in or nearby the same drilling field, such as monitoring devices, air condition and ventilating devices, lifting devices, and so on.

In general, the drilling rig, oil/gas production equipment, and other auxiliary equipment operate independently and are powered by separate respective power supplies. Typically, the drilling rig, oil/gas production equipment, and other auxiliary equipment are driven by diesel driven generators. In addition, during a drilling operation of the drilling rig, some excess energy may be consumed if the power used during this operation process becomes unstable.

It would be desirable to provide systems and methods to reduce the energy requirements for drilling rigs and oil/gas production equipment.

BRIEF DESCRIPTION

One aspect of the present invention resides in a power integrated system in a drilling field. The power integrated system includes a gas storage unit, a gas driven generator, a power bus, a drilling rig, oil/gas production equipment, and a gas reformer. The gas storage unit is used for storing natural gas. The gas driven generator is used for generating electric power based on the stored natural gas. The power bus is used for receiving the electric power generated by the gas driven generator. The drilling rig is used for being driven by the electric power from the power bus. The oil/gas production equipment is used for being driven by the electric power from the power bus and for generating associated gas. The gas reformer is used for reforming the associated gas and supplying the reformed gas to the gas storage unit.

Another aspect of the present invention resides in a power integrated method for managing electric power in a drilling field. The power integrated method includes: using a gas driven generator for generating electric power; injecting the generated electric power into a power bus; driving a drilling rig and oil/gas production equipment using the electric power from the power bus; generating associated gas from the oil/gas production equipment; reforming the associated gas; and transferring the reformed gas into a gas storage unit for use by the gas driven generator.

Yet another aspect of the present invention resides in a power integrated method for managing electric power in a drilling field. The power integrated method includes: using a gas driven generator for generating electric power; driving a drilling rig and oil/gas production equipment using the electric power generated by the gas driven generator; generating associated gas from the oil/gas production equipment; reforming the associated gas; and transferring the reformed gas into a gas storage unit for use by the gas driven generator.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

Figure 1:
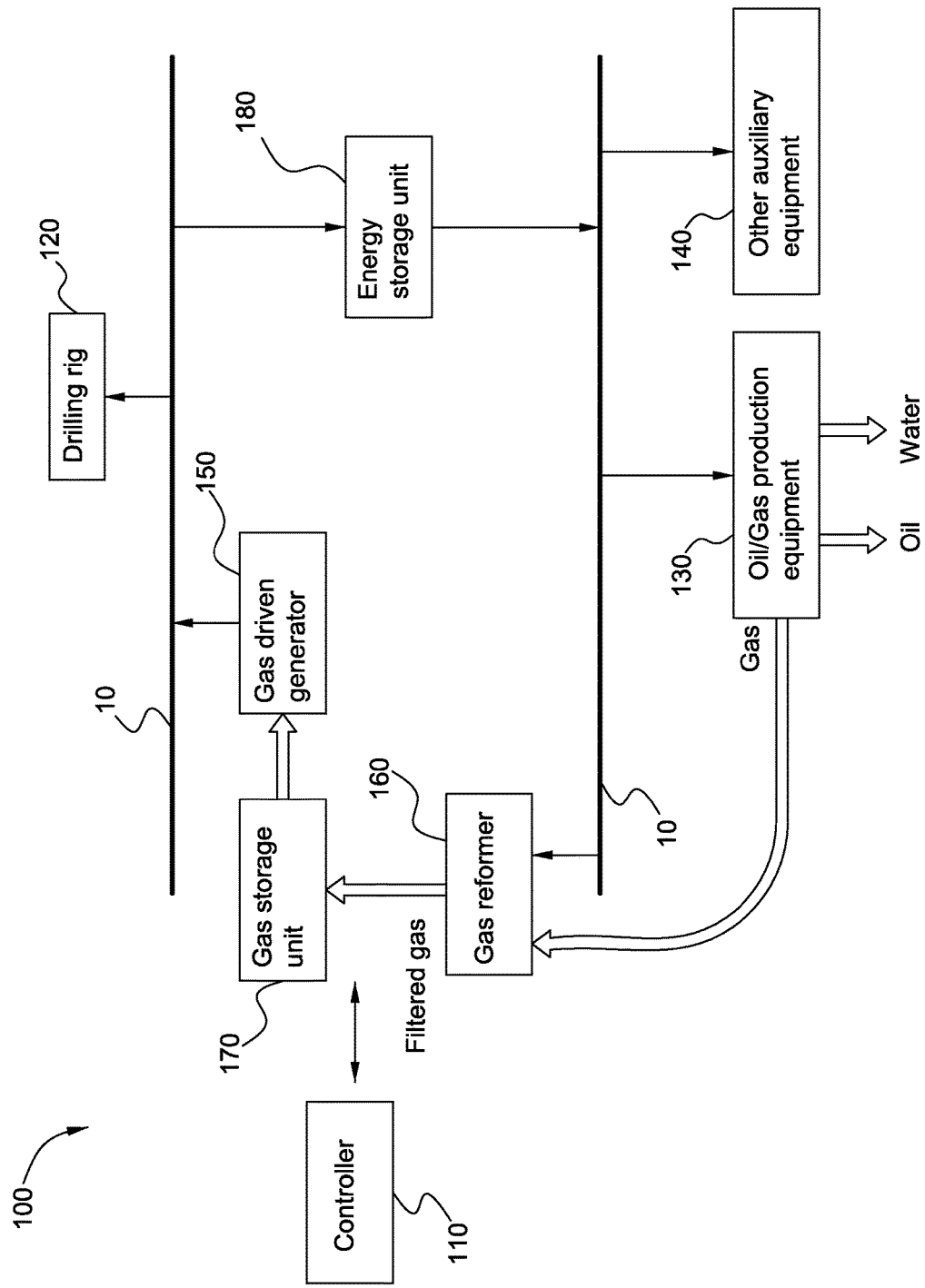
FIG. 1 is a schematic diagram of a power integrated system in accordance with one exemplary embodiment of the present disclosure.

Referring to FIG. 1, a power integrated system 100 in accordance with one exemplary embodiment of the present disclosure is shown. The power integrated system 100 is applied in (or nearby) a drilling field, such as an offshore drilling field, to provide an optimized power distribution mode to electric equipment operated in or nearby the drilling field.

In the illustrated embodiment of FIG. 1, the power integrated system 100 generally includes a controller 110, a drilling rig 120, oil/gas production equipment 130, other auxiliary equipment 140, a gas driven generator 150, a gas reformer 160, a gas storage unit 170, and an energy storage unit 180. For ease of explanation, some devices in the drilling field are not shown in FIG. 1, for example some housing and supporting devices are not shown.

In the power integrated system 100, the drilling rig 120, the oil/gas production equipment 130, and the other auxiliary equipment 140 are electric equipment. The auxiliary equipment 140 may include monitoring devices, air condition and ventilating devices, lifting devices, etc., according to different drilling field needs. The gas driven generator 150, the gas storage unit 170, and the energy storage unit 180 are power supplying equipment. The controller 110 is used control the power distribution from the power supplying equipment (150, 170, 180) to the electric equipment (120, 130, 140). The controller 110 may be a separated control unit or an embedded control unit integrated in a control platform of the drilling field (not shown).

The gas storage unit 170 along with the gas driven generator 150 provide the bulk of the power from the power supply equipment. The gas storage unit 170 is used to store natural gas. Part of the stored natural gas may be stored in advance, and part of the stored natural gas may be collected from the oil/gas production equipment 130 through the gas reformer 160. The gas driven generator 150 is used to generate electric power based on the natural gas stored in the gas storage unit 170. In the illustrated embodiment of FIG. 1, the gas storage unit 170 and the gas driven generator 150 are two separate devices, but in other embodiments, they can be combined together as an integrated device. Furthermore, although the gas driven generator 150 is represented by a single block in FIG. 1, in some embodiments the gas driven generator 150 can be separated into a gas engine and a generator or other appropriate configurations. Compared with conventional diesel driven generators, the gas driven generator 150 can reduce cost and be more environmentally friendly.

During power transmission, the generated electric power from the gas driven generator 150 will be injected into an electric power bus 10 and then provided to the electric equipment, namely the drilling rig 120, the oil/gas production equipment 130, other auxiliary equipment 140, according to individual requirements. In one embodiment, during drilling operations, the energy storage unit 180 will be charged by excess energy of electric power from the gas driven generator 150 through the power bus 10. After the energy storage unit 180 is charged, when needed, the stored electric power in the energy storage 180 can be returned to the power bus 10 to provide electric power together with the gas driven generator 150. Therefore, excess energy generated by the gas driven generator 150 during the drilling operation of the drilling rig 120 may be recycled to the power bus 10, which can increase power efficiency. Furthermore, because the excess energy generated by the gas driven generator 150 during the drilling operation of the drilling rig 120 is charged into the energy storage unit 180, the drilling operation of the drilling rig 120 may be more stable.

As mentioned above, part of the stored natural gas in the gas storage unit 170 may be collected from the oil/gas production equipment 130 through the gas reformer 160. In such an embodiment, the oil/gas production equipment 130 is used to exploit oil and natural gas (namely associated gas) from oil wells drilled by the drilling rig 120 to earth surface. Furthermore, the oil/gas production equipment 130 will separate out the associated gas, oil and water respectively, for example through a production separator (not shown). The separated gas or at least part of the separated gas may be treated by the gas reformer 160 in real time, to become cleaned/filtered natural gas which can be directly used as a fuel, and the cleaned gas is injected into the gas storage unit 170 to provide recycled fuel to the gas driven generator 150.

Because the gas storage unit 170 can be filled by the cleaned gas from the gas reformer 160, the power utilization is extremely improved. One benefit is that the associated gas from the oil/gas production equipment 130 is effectively used and not wasted. Another benefit is that the gas storage unit 170 can be consistently at a level to provide sufficient fuel to the gas driven generator 150, and the cleaned gas is generated in or nearby the drilling field instead of having to be delivered from a remote location. The excess gas may be burned directly, or shipped to somewhere, or stored in a large storage tank, for example.

Figure 2:
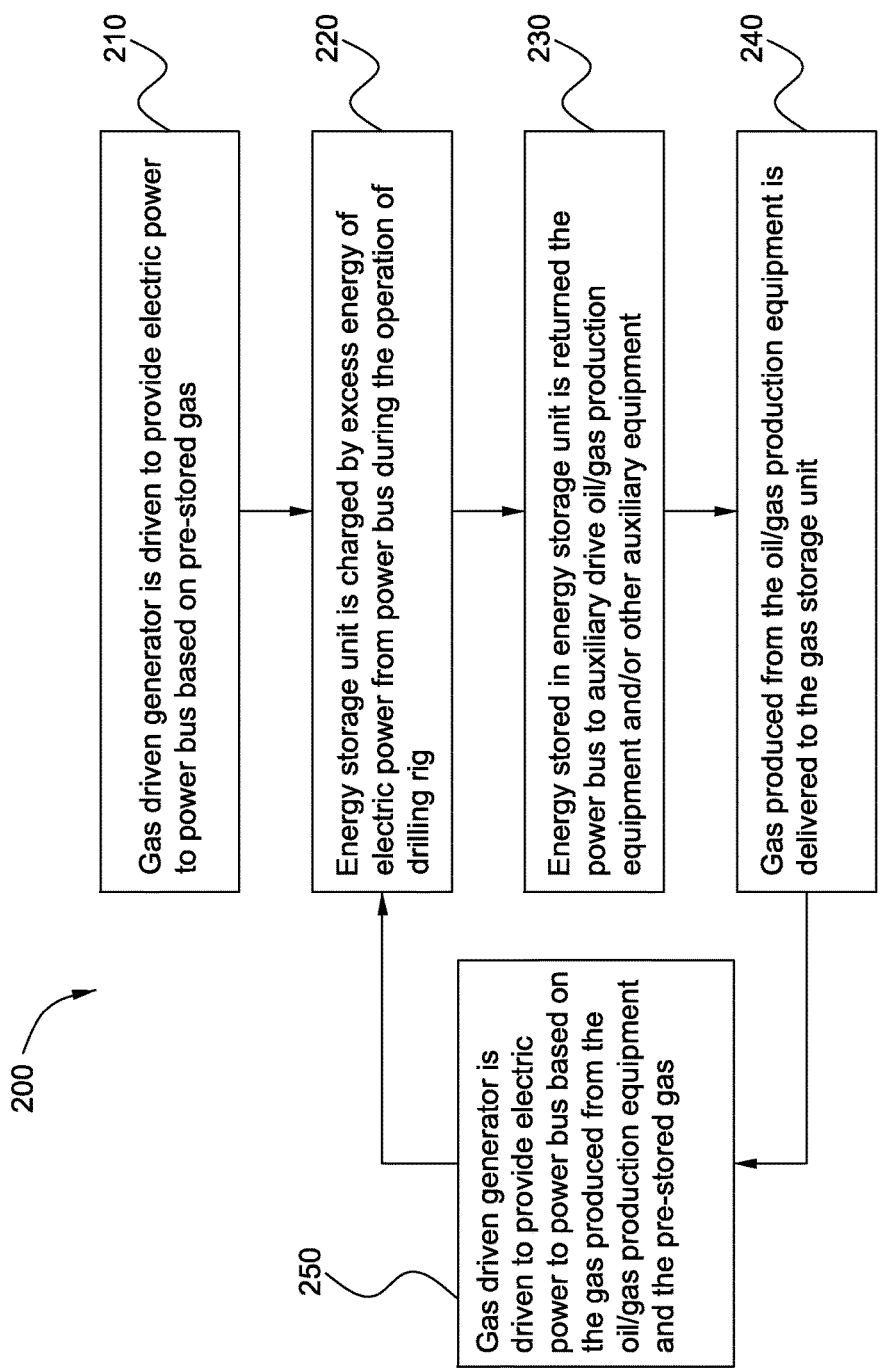
FIG. 2 is a flowchart of a power integrated method in accordance with one exemplary embodiment of the present disclosure.

Referring to FIG. 2, a flowchart of a power integrated method 200 performed by the controller 110, in accordance with one exemplary embodiment of the present disclosure, is shown. The power integrated method 200 mainly includes the following steps.

In step 210, the gas driven generator 150 is driven to provide electric power to the power bus 10 based on pre-stored gas in the gas storage unit 170. In one embodiment, at an initial stage of operation, before any gas is available from gas reformer 160, a separate source of fuel is provided in the gas storage unit 170. In other embodiments, at an initial stage of operation, if the oil/gas production equipment 130 is temporarily powered by another, separate generator, such as a diesel driven generator (not shown), the gas storage 170 may achieve the initial fuel from the oil/gas production equipment 130 through the gas reformer 160.

In step 220, after the power bus 10 receives electric power from the gas driven generator 150 and the drilling rig 120 is in a drilling operation status, the energy storage unit 180 is charged by excess energy of electric power from the power bus 10. Typically the excess power results when the operation of the drilling rig 120 is unstable. Thus, the energy storage unit 180 is introduced here to receive and recycle that excess energy.

In step 230, after the energy storage unit 180 is charged, the energy stored in the energy storage unit 180 may be returned the power bus 10 to drive the auxiliary drive the oil/gas production equipment 130 and/or other auxiliary equipment 140 together with the gas driven generator 150. In other word, the excess energy of electric power generated from the power bus 10 during the drilling operation of the drilling rig 120 is used again in the whole system which increases power efficiency. The following paragraphs together with FIG. 6 will show a detailed configuration of an embodiment of the power integrated system 100.

In step 240, after the oil/gas production equipment 130 is driven by the electric power from the power bus 10, the associated gas is produced, and the associated gas is cleaned/filtered by the gas reformer 160, and at least part of the cleaned/filtered gas is injected into the gas storage unit 170 to meet the fuel requirement of the gas driven generator 150. As mentioned above, the associated gas generated from the oil/gas production equipment 130 is effectively and timely used, and the cleaned gas is generated in or nearby the drilling field instead of being delivered from a remote place.

In step 250, after the cleaned gas from the gas reformer 160 is injected into the gas storage unit 170, the gas driven generator 150 can be continuously driven to provide electric power to power bus 10, and then the process will repeat from step 220 to 250, until other interference commands are performed, such as a drilling stop command for example. In some cases, the power supplied to the drilling rig 120, the oil/gas production equipment 130, and other auxiliary equipment 140 can be mainly achieved by the associated gas from the oil/gas production equipment 130, which can extremely increase power efficiency and reduce cost.

Figure 3:
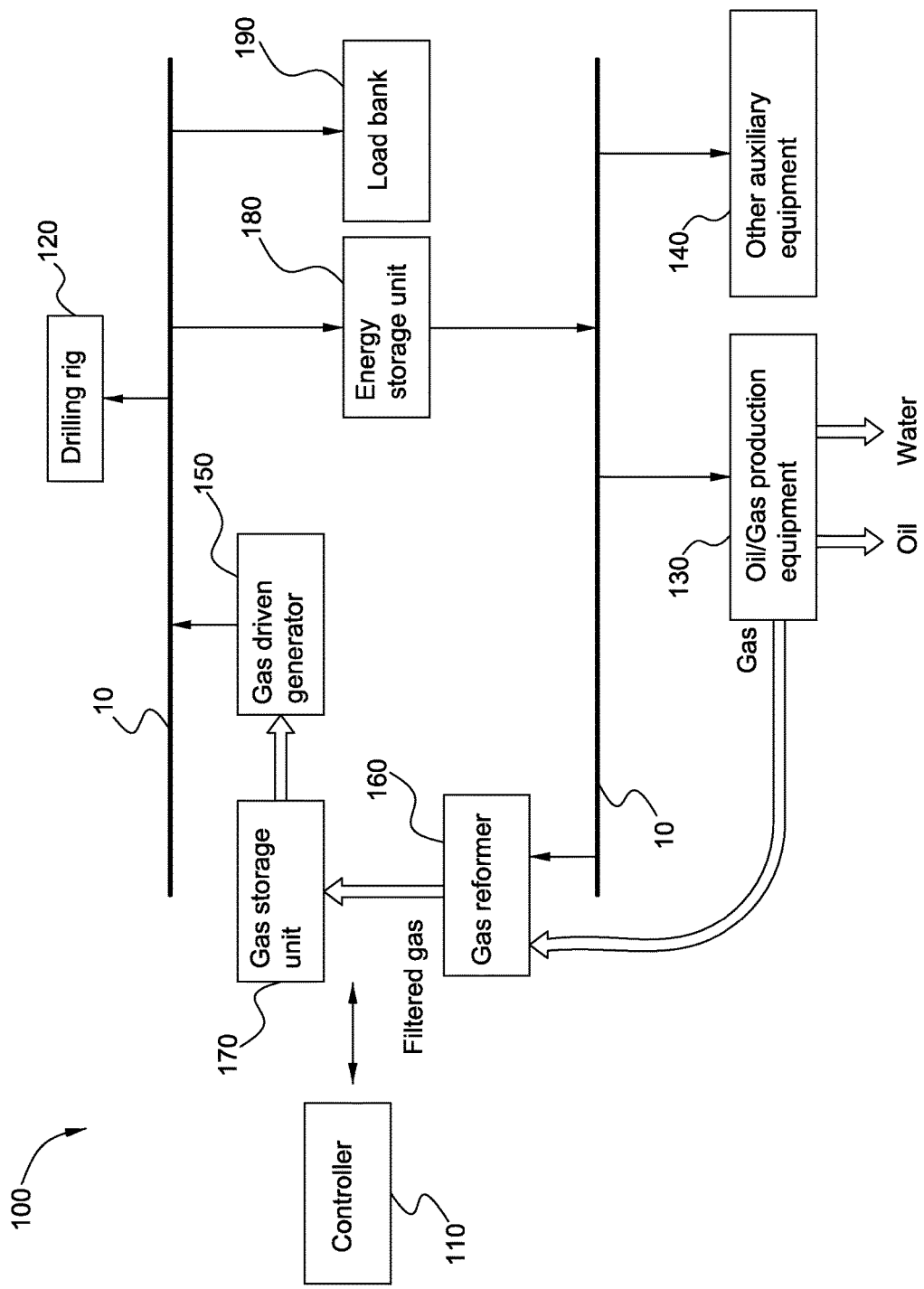
FIG. 3 is a schematic diagram of a power integrated system in accordance with another exemplary embodiment of the present disclosure.

Referring to FIG. 3, a power integrated system 100 in accordance with another exemplary embodiment of the present disclosure is shown. In some cases, during the drilling operation of the drilling rig 120, some excess energy of electric power from the gas driven generator 150 will be generated as mentioned above. If the energy storage unit 180 cannot receive all of the excess energy for some reason such as, storage capacity of the energy storage 180 being exceeded or a slow charging time of the energy storage unit 180, a load bank 190 may be added to the power integrated system 100. The load bank 190 may comprise resistors, for example, that are used to consume the excess energy the energy storage unit 180 cannot receive and to prevent the related equipment from being damaged.

Figure 4:
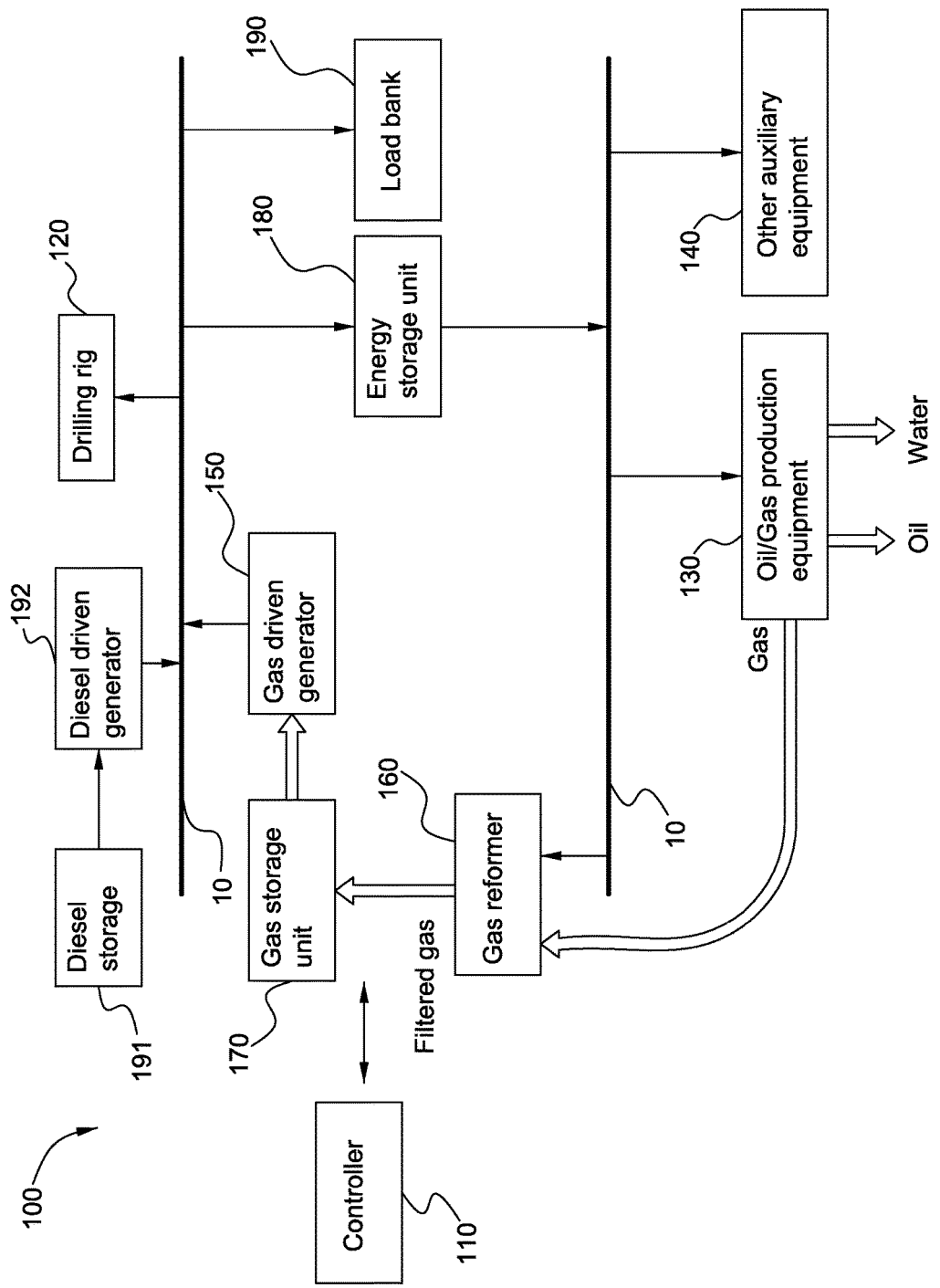
FIG. 4 is a schematic diagram of a power integrated system in accordance with yet another exemplary embodiment of the present disclosure.

Referring to FIG. 4, a power integrated system 100 in accordance with another exemplary embodiment of the present disclosure is shown. In some cases, if the gas driven generator 150 along is not sufficient to meet the power needs of some equipment in or nearby the drilling field, a diesel storage 191 and a diesel driven generator 192 may be used to provide quickly power supplying response in the power integrated system 100. In such embodiments, the diesel driven generator 192 is an additional, secondary power supply that is only used when the gas driven generator 150 cannot meet the power needs of some equipment.

Figure 5:
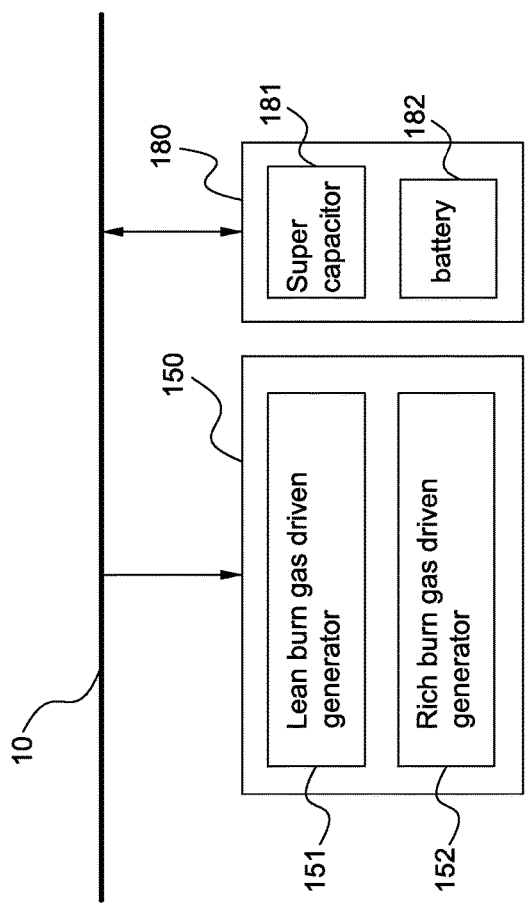
FIG. 5 is a schematic diagram of a gas driven generator and an energy storage unit of the power integrated system of FIG. 4, in accordance with one exemplary embodiment of the present disclosure.

Referring to FIG. 5, a schematic diagram of the gas driven generator 150 and the energy storage unit 180, in accordance with one exemplary embodiment of the present disclosure, is shown. In this illustrated embodiment, the gas driven generator 150 comprises a gas driven generation system including a lean burn gas driven generator 151 and a rich burn gas driven generator 152. In other embodiments, the gas driven generator 150 may only include a lean burn gas driven generator 151 or only include a rich burn gas driven generator 152 based on different design needs.

In general, when the gas driven generator 150 only includes the lean burn gas driven generator 151, the load bank 190 may need to be introduced in the power integrated system 100. But, when the gas driven generator 150 further includes the rich burn gas driven generator 152, the load bank 190 is less likely to be needed in the power integrated system 100.

In this illustrated embodiment of FIG. 5, the energy storage unit 180 may include a super capacitor 181 and a battery 182 (or a flywheel) which can be charged. In other embodiments, the energy storage unit 180 may only include a super capacitor 181 or only include a battery 182 based on different design needs.

In general, the super capacitor 181 can provide a rapid charge and discharge function to the power bus 10. The battery 182 can provide a large capacity charge and a stable discharge function to the power bus 10. Based on different circumstances, the super capacitor 181 or the battery 182 or both may be operated accordingly.

Figure 6:
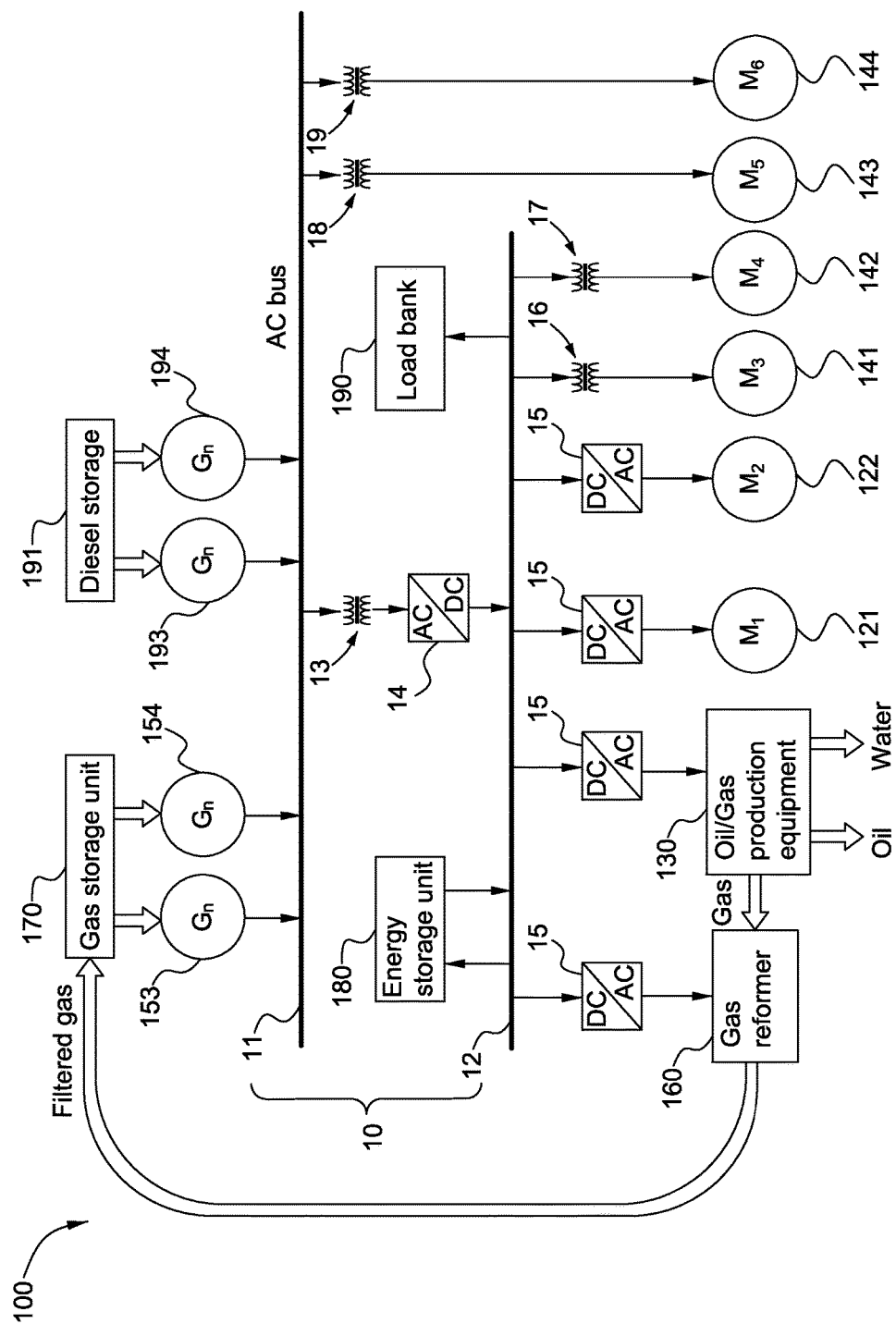
FIG. 6 is a configuration diagram of a power integrated system in accordance with one exemplary embodiment of the present disclosure.

Referring to FIG. 6, a configuration diagram of the power integrated system 100 in accordance with one exemplary embodiment of the present disclosure is shown.

As an example, the power integrated system 100 includes two gas driven generators 153 and 154, and two diesel driven generators 193 and 194. In other embodiments, the number of the gas driven generators and diesel driven generators can be adjusted according to actual electricity consumption. FIG. 6 is shown as a simple example to explain how the power integrated system 100 works.

In this illustrated embodiment of FIG. 6, the power bus 10 includes an alternating current (AC) bus 11 and a direct current (DC) bus 12. Firstly, the gas driven generators 153 and 154 generate electric power and inject the generated electric power into the AC bus 11. When the generated electric power from the gas driven generators 153 and 154 can meet the needs of the whole system, the diesel driven generators 193 and 194 are not applied. When the generated electric power from the gas driven generators 153 and 154 cannot meet the needs of the whole system, the diesel driven generators 193 and 194 will be applied according to commands from the controller 110. Namely, the diesel driven generators 193 and 194 are operated as secondary generators. This is because the diesel driven generators 193 and 194 are more likely to result in pollutants and have higher fuel costs than the gas driven generators 153 and 154. In this manner, the power integrated system 100 uses natural gas as the main fuel.

The power integrated system 100 further includes a transformer 13 and a rectifier 14. The AC electric power in the AC bus 11 is transformed and then rectified into DC electric power, and then injected into the DC bus 12. In other embodiments, the number and type of the transformer 13 and the rectifier 14 can be adjusted according to different design needs.

In some cases, in or nearby the drilling field, some devices may be driven by AC power directly. Therefore, a part of the AC electric power in the AC bus 11 may be transformed first through some transformers 18 and 19, and then provided to some AC devices directly, such as the shown devices 143 and 144 for example.

After the DC bus 12 is injected with DC electric power from the AC bus 11, for example through the transformer 13 and the rectifier 14, the DC electric power in the DC bus 12 will be provided to different equipment, such as the oil/gas production equipment 130, the gas reformer 160, the drilling rig 120 (shown as two sub-devices 121 and 122 in FIG. 6), and other auxiliary equipment 140 (shown as devices 141 and 142 in FIG. 6).

Some of the auxiliary equipment is shown in FIG. 6 as being driven by DC electric power and the some as being driven by AC electric power. But such an arrangement is for purposes of example only. For the AC power equipment that will be receiving power from DC bus 12, an inverter 15 may be introduced to invert the DC electric power into AC electric power. For the DC power equipment that will be receiving power from DC bus 12, if needed, a transformer (16 and 17) may be introduced to transform the voltage level to an appropriate voltage level.

During the drilling operation of the drilling rig 120, such as the sub-devices 121 and 122, some excess energy of the electric power will be generated due to the fact that the power supply for the operation of the drilling rig 120 is constantly changing. The generated excess energy will be supplied to into the energy storage unit 180 as long as the energy storage unit 180 has sufficient capacity and can receive the energy in a fast enough manner. If some excess energy cannot be charged into the energy storage 180 in a timely manner, the load bank 190 may be used to consume this part of excess energy.

Furthermore, the stored energy of the energy storage unit 180 can be recycled into the DC bus 12 as needed. Therefore, the stored energy of the energy storage 180 is reused, which can increase power efficiency.

After the oil/gas production equipment 130 is operated, some associated gas will be generated accordingly. The gas reformer 160 will clean/filter at least part of this associated gas, and then the filtered gas is transferred into the gas storage 170.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

The invention claimed is:

1. A power integrated method for managing electric power in a drilling field, the method comprising:
    using a gas driven generator for generating electric power;
    injecting the generated electric power into a power bus;
    driving a drilling rig operative to obtain well products and oil/gas production equipment operative for separating associated gas from the well products using the electric power from the power bus;
    charging an energy storage unit during a drilling operation of the drilling rig with excess energy from the power bus to obtain stored energy;
    reforming separated associated gas to obtain reformed gas; and
    transferring the reformed gas into a gas storage unit for use of the reformed gas by the gas driven generator.

2. The method of claim 1, further comprising:
    returning the stored energy of the energy storage unit into the power bus.

3. The method of claim 2, further comprising, when the energy storage unit cannot accommodate excess energy, sending unaccommodated excess energy to a load bank.

4. The method of claim 1, further comprising:
    generating secondary electric power using a diesel driven generator; and
    injecting the secondary electric power into a power bus.

5. The method of claim 1, further comprising driving auxiliary equipment using the electric power from the power bus.

6. A power integrated method for managing electric power in a drilling field, the method comprising:
    using a gas driven generator for generating electric power;
    driving a drilling rig operative to obtain well products and oil/gas production equipment operative for separating associated gas from the well products using the electric power generated by the gas driven generator;
    charging an energy storage unit during a drilling operation of the drilling rig with excess energy from a power bus to obtain stored energy;
    reforming separated associated gas to obtain reformed gas; and
    transferring the reformed gas into a gas storage unit for use of the reformed gas by the gas driven generator.

7. The method of claim 6, further comprising:
    returning the stored energy of the energy storage unit to drive equipment in the drilling field.

8. The method of claim 7, further comprising, when the energy storage unit cannot accommodate excess energy, consuming unaccommodated excess energy through an energy consuming device.

9. The method of claim 7, further comprising driving auxiliary equipment using the electric power generated by the gas driven generator and/or stored in the energy storage unit.

* * * * *